United States Patent [19]

Amano et al.

[11] 3,877,638

[45] Apr. 15, 1975

[54] TEMPERATURE CONTROLLING APPARATUS FOR AUTOMATIC AIR CONDITIONING

[75] Inventors: Matsuo Amano, Hitachi; Ichiro Kimura, Mito; Tosikatsu Ito, Ibaraki; Katsuo Kanemoto, Katsuta, all of Japan

[73] Assignee: Hitachi, Ltd., Tokyo, Japan

[22] Filed: Oct. 5, 1973

[21] Appl. No.: 403,833

[52] U.S. Cl............. 237/2 A; 165/42; 236/68 R; 236/84; 236/87; 236/91
[51] Int. Cl.. B60h 1/04; G05b 11/32; G05d 23/275
[58] Field of Search............. 236/87, 91, 68 R, 84; 165/42; 237/12, 3 B, 2 A

[56] References Cited
UNITED STATES PATENTS

| | | | |
|---|---|---|---|
| 3,294,320 | 12/1966 | Franz | 236/87 |
| 3,428,115 | 2/1969 | Caldwell | 236/84 X |
| 3,476,316 | 11/1969 | Franz | 236/87 |
| 3,685,732 | 8/1972 | Haskins et al | 236/68 R |
| 3,761,017 | 9/1973 | Mohri | 237/12.3 A |

Primary Examiner—William E. Wayner
Attorney, Agent, or Firm—Craig & Antonelli

[57] ABSTRACT

A temperature controlling apparatus for automatic air conditioning wherein a heat-generating member is provided in connection with a member displacing in response to the change of temperature, that is, a temperature sensing member, the heat-generating member being adapted to receive an electric output corresponding to the detected temperature to convert the electric output into a pressure, and the temperature sensing member being adapted to detect a surrounding temperature. The force generated by the temperature sensing member is balanced with the force due to a gas pressure bearing against a movable member within an output pressure chamber communicated to a source of gas pressure so as to operate an actuator communicating to the output pressure chamber with a gas pressure corresponding to the detected temperature, thereby to carry out air conditioning for a car room or the like.

7 Claims, 6 Drawing Figures

TEMPERATURE CONTROLLING APPARATUS FOR AUTOMATIC AIR CONDITIONING

BACKGROUND OF THE INVENTION

1. Field of the Invention

This invention relates to a temperature controlling apparatus for automatic air conditioning, and more particularly to such apparatus which may be suitably mounted in an automotive car.

2. Description of the Prior Art

In general, in an automotive car, an electric temperature controlling apparatus for automatic air conditioning is utilized. This apparatus is such that a thermistor is used to detect a temperature and the sensed electric output passes through an amplifier and is then converted into an air pressure by means of a transducer so as to effect temperature controlling by operating an actuator by the use of this air pressure. In the said electric type apparatus, additional means is required to convert the electric output into an air pressure in final stage.

Heretofore, as this converting means, a hot-wire or an electro-magnet has been used. However, in the hot-wire, it per se tends to be affected by surrounding temperature, and, therefore, a careful consideration must be given in positioning the hot-wire at a selected place in the car room where the change of temperature is minimum. Further, since the hot-wire is long in structure and utilizes the elasticity of the heat-generating resistor wire per se, it is frequently disconnected because of over-current therethrough and the vibration thereof. On the other hand, the device using the electro-magnet, possesses such disadvantages that centering is difficult and further it is yielding to vibration.

Furthermore, an attempt was made to regulate an input of air pressure and an output of converted air pressure by the displacement of a bimetallic strip around which a heat-wire is wound. However, in this case, the bimetallic strip in the transducer maintains the air pressure supply side in an opening condition so that air pressure continues to flow from the inlet side to the outlet side. For this reason, special means is required for correcting the bimetallic strip by effecting current control with a potentiometer. Moreover, since the bimetallic strip and a valve body are independent units, the valve body does not operate in response to the displacement of the bimetallic strip, and the whole construction becomes complicated.

SUMMARY OF THE INVENTION

This invention is to overcome the above-mentioned disadvantages. One of the objects of this invention is to provide a temperature controlling apparatus for automatic air conditioning with a simple construction and a good controlled-characteristic. Another object of this invention is to provide a temperature controlling apparatus for automatic air conditioning which is small in size and is excellent in mounting capability and has a long life.

The characteristic features of this invention lie in that a heat-generating member is provided in connection with a member displacing in response to the change of temperature, that is, a temperature sensing member, said heat-generating member being adapted to receive an electric output corresponding to the detected temperature to convert the electric output into a pressure, and the temperature sensing member being adapted to detect a surrounding temperature, and that the force generated by the temperature sensing member is balanced with the force due to a gas pressure bearing against a movable member within an output pressure chamber communicated to a source of gas pressure to apply to an actuator a gas pressure corresponding to the detected temperature, thereby to condition the temperature of air in a car room, for example.

DESCRIPTION OF THE PREFERRED EMBODIMENTS

Figure 1:
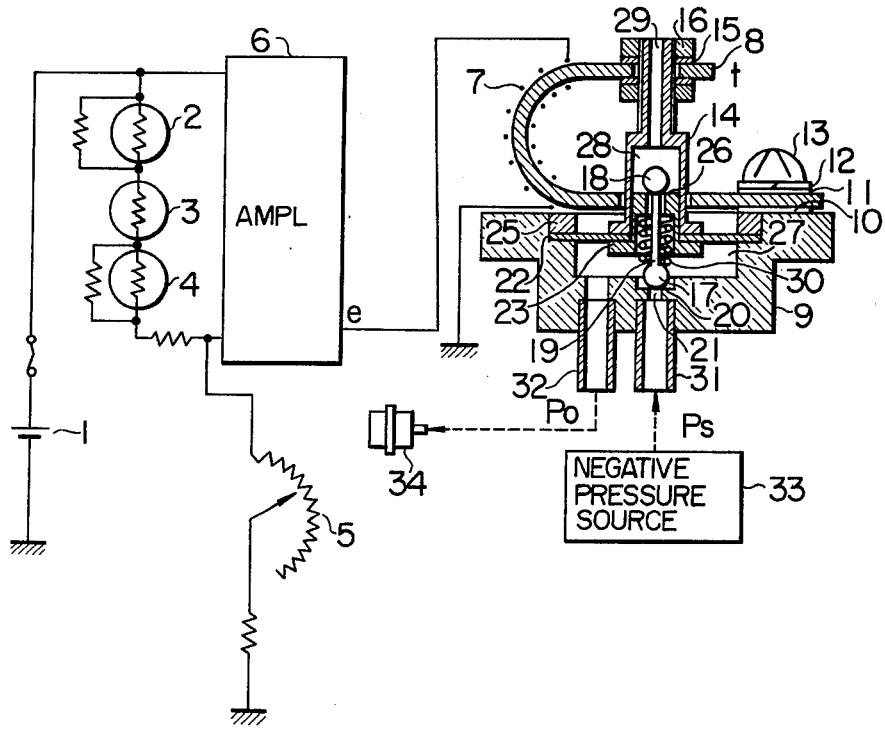
FIG. 1 is a schematic view showing one embodiment of the temperature controlling apparatus constructed in accordance with this invention, only a transducer used therein being shown in a front sectional form.

Referring to FIG. 1 showing one embodiment of this invention, reference numeral 1 designates an electric power supply, 2 a thermistor positioned in a duct, 3 a thermistor mounted in a vehicle, 4 a thermistor exposed to the external air and 5 a variable resistor, all being connected in series with one another. The series connection of the three thermistors 2 - 4 is connected in parallel with amplifier 6. Output voltage e from amplifier 6 is coupled to heat-generating member as an input for a transducer. Reference numeral 8 designates a temperature sensing member consisting of a bimetallic strip, etc., one end thereof being fixed to flange 9 by means of plate 10, washer 11, spring-washer 12 and screw 13, for example, and the other end is fixed to connecting rod 14 by means of washer 15 and nut 16, for example, so as to subject the connecting rod 14 to a strain. Heat-generating resistor or wire 7 is wound and coiled around the temperature sensing member 8. With this construction, temperature sensing and conversion into air pressure can be effected simultaneously. Reference numerals 17 and 18 designate valve bodies interconnected through rod 19 to each other, one of which is opposed to the path on the side of the source of negative pressure and the other valve body being opposed to the path on the side of the atmospheric pressure. Reference numeral 20 designates a valve portion formed across negative pressure side path 21 provided in flange 9. Reference numeral 22 designates a movable member such as a diaphragm fixed to connecting rod 14 with metal piece 23 and to flange 9 with collar 25. Reference numeral 26 designates a valve portion formed between valve body 18 and metal piece 23. Reference numeral 27 designates an output negative pressure chamber defined by flange 9, diaphragm 22, metal piece 23, etc. Reference numeral 28 designates an atmospheric pressure chamber communicating with the air through communicating passage 29 in connecting rod, said atmospheric pressure chamber insulated from the above-mentioned output negative pressure chamber 27. Reference numeral 30 designates a spring acting to hold valve portion 26 in a closed position. Reference numerals 31 and 32 designate piping members attached to flange 9, respectively, one 31 of which couples source 33 of negative pressure of the intake manifold of the vehicle to output negative pressure chamber 27, and the other piping member exhausts output negative pressure $P_o$ within output negative pressure chamber 27. Reference numeral 34 designates an actuator operating a temperature control valve body in response to output negative pressure $P_o$.

Figure 5:
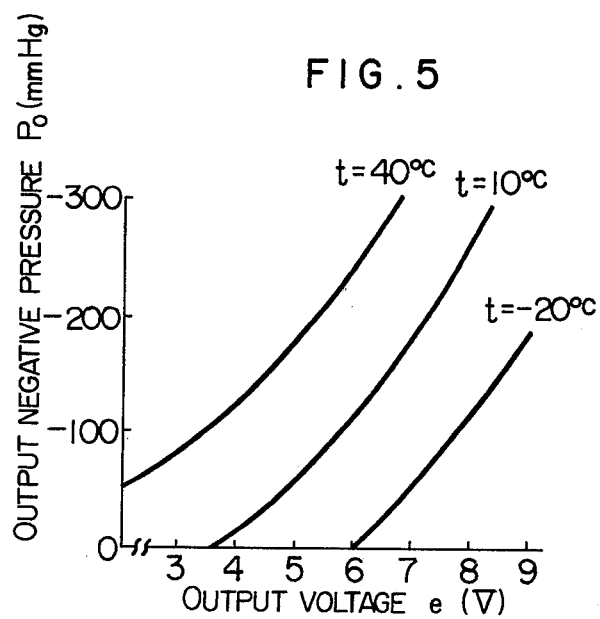
FIG. 5 is an explanatory view of the characteristic of the transducer of this invention.

The function of the arrangement above will be explained hereunder with reference to FIG. 5 showing a schematic diagram of the characteristic necessary for the transducer. In FIG. 5, output voltage $e$ from amplifier 6 applied to heat-generating wire 7 of the transducer is given on the abscissa and output negative pressure $P_o$ is given on the ordinate. Various curves are plotted using parameters of temperature $t$. It is assumed that temperature sensing member 8 will be displaced so as to spread its U-shaped configuration in response to heat from heat-generating wire 7 (in this case, the displacement direction of the temperature sensing member does not matter). Now, assuming that surrounding temperature $t$ is 10°C and output voltage $e$ applied to heat-generating wire 7 is 6 volts, then, output negative pressure $P_o$ in the transducer is −120 mmHg as is clear from FIG. 5, and a balanced condition is produced wherein a downward force acting against movable member 22 within output negative pressure chamber 27 is balanced with an upward force generated by temperature sensing member 8 by the fact that the output voltage of 6 volts has been applied to heat generating wire 7, so that both valve portions 20 and 26 are in a closed position. From this condition, if output voltage $e$ is increased to 7 volts, then temperature sensing member 8 is more heated, so that the upward force is increased to bring valve portion 20 into a closed position. As a result, supply negative pressure $P_s$ is supplied to output negative pressure chamber 27 through supply negative pressure side communicating passage 21 until valve portion 20 will be brought into a closed position. That is to say, output negative pressure $P_o$ bearing against movable member 22 becomes greater by the increment of the upward force and in response thereto the downward force increases, so that both valve portions 20 and 26 are balanced into their closed positions. Therefore, output negative pressure $P_o$ is shifted from −120 mmHg to −180 mmHg.

Next, if output voltage $e$ is changed from 7 volts to 5 volts, then, since the amount of heat generated from heat-generating wire 7 is decreased and in response thereto the upward force against temperature sensing member 8 is decreased, an unbalanced condition is created wherein valve portion 26 is opened to release output negative pressure $P_o$ in output negative pressure chamber 27 through atmospheric pressure chamber 28 and communicating passage 29 to the air. Therefore, in proportion to the decreased portion of the upward force, the downward force bearing against the movable member within the output negative pressure chamber is decreased and this is balanced at a position wherein valve member 26 is closed. That is, at the balanced position, both valve portions 20 and 26 are always in the closed position. Thus, output negative pressure $P_o$ is changed from −180 mmHg to −60 mmHg. The transducer provides output negative pressure $P_o$ proportional to output voltage $e$, which is transmitted to the actuator to operate the temperature controlling valve.

This transducer may provide output negative pressure $P_o$ varying in response to the change of surrounding temperature $t$. In this case, the open and close modes of operation of both valve portions 20 and 26 are quite the same as in the above explanation.

Now, assuming that output voltage $e$ is the constant value of 6 volts and surrounding temperature $t$ is 10°C, output negative pressure $P_o$ is −120 mmHg. At this time, both valve portions 20 and 26 are balanced with their closed positions. From this condition, if surrounding temperature $t$ changes into 40°C, then the upward force against temperature sensing member 8 is increased by the increased portion of surrounding temperature $t$, so that valve portion 20 is brought into a closed position wherein output negative pressure $P_o$ in output negative pressure chamber 27 becomes greater and the downward force against movable member 22 increases according to the increase of the upward force. Thereafter, valve portion 20 will be closed to provide a balanced condition. Thus, output negative pressure changes from −120 mmHg to −240 mmHg.

Further, when surrounding temperature $t$ becomes from 40°C to −20°C, output negative pressure $P_o$ will be 0 mmHg. Therefore, the transducer can provide output negative pressure $P_o$ proportional to surrounding temperature $t$, said output negative pressure $P_o$ varying substantially linearly with output voltage $e$ and surrounding temperature $t$.

Figure 2:
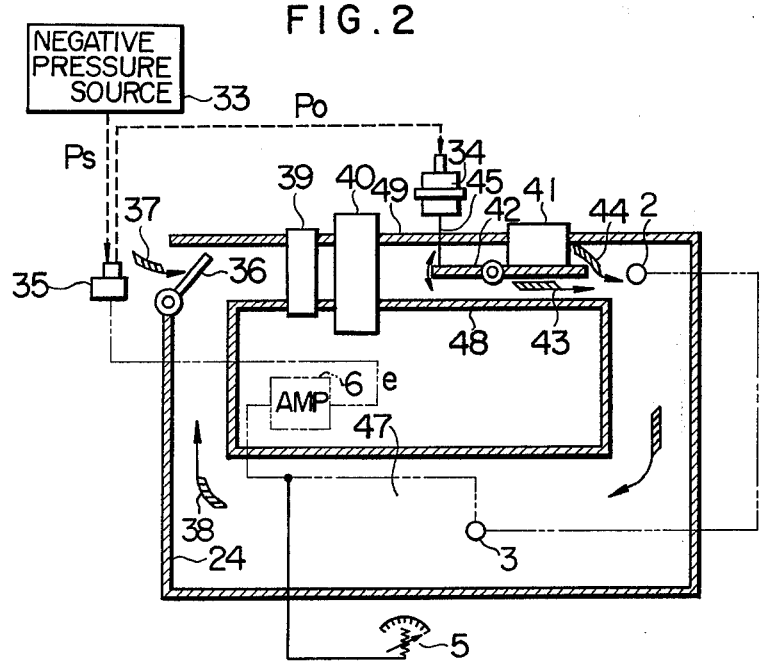
FIG. 2 shows one application wherein the temperature controlling apparatus constructed in accordance with this invention has been used for automatic air conditioning.

FIG. 2 shows one embodiment of a temperature controlling apparatus for automatic air conditioning using the temperature controller of this invention. Reference numeral 35 designates a transducer in accordance with this invention. Reference numeral 36 designates an inside/outside air switching door for setting a mixing rate of outside air 37 and inside air 38 which are insulated from each other by means of wall 24. Reference numeral 39 designates a blower. Reference numeral 40 designates a heat exchanger for air-cooling. Reference numeral 41 designates a heat exchanger for air-heating. Reference numeral 42 designates a damper disposed between heat exchangers 40 and 41, which acts to vary the rate of heated air 44 with respect to cooled air 43. Damper 42 is coupled to actuator 34 through suitable means such as rod 45 to control preferably the mixing rate of the cooled and heated airs which will be transmitted into a car room 47. Reference numerals 48 and 49 designate low and high side walls, respectively, defining an air passage. Thermistor 2 for duct is positioned at a place wherein the said cooled and heated airs are mixed while thermistor 3 for car room is positioned at an appropriate place within car room 47. In order to detect an outdoor temperature, transducer 35 of this invention is used for providing output negative pressure $P_o$ directed into the actuator. Damper 42 is adapted to contact with low side wall 48 when output negative pressure $P_o$ is −100 mmHg and with high side wall 48 when $P_o$ is −200 mmHg.

Now, it is assumed that the external or outdoor air 37 is at a temperature of 10°C and the temperature in car room 47 is set at 20°C with temperature setting volume control 5 and the output voltage from amplifier 6 is 6 volts. In these conditions, as is clear from the characteristic curves in FIG. 5, output negative pressure $P_o$ is $-120$ mmHg. Therefore, damper 45 is set to a position near low side wall 48 so as to provide such a mixture that the proportion of heated air 44 to cooled air 43 is greater.

If the temperature of outdoor air changes from 10°C to 25°C, then, transducer 35 provides output negative pressure $P_o$ of $-170$ mmHg shifted from that of $-120$ mmHg (assuming that output voltage is 6 volts). As a result, damper 42 operating to control the car room temperature in response to the change of the outdoor temperature to maintain the car room temperature to a predetermined temperature is set to a position near high side wall 49 so as to provide such a mixture that the proportion of cooled air 43 to heated air 44 is greater. Thus, the temperature in car room temperature 47 can be continuously controlled to maintain a temperature preset by setting volume control 5 of 20°C, for example.

In the temperature controlling apparatus for automatic air conditioning of this invention, since it is considered that a force due to an output pressure in output negative pressure chamber 27 bearing against movable member 22 so as to return a displacement of temperature sensing member 8 consisting of a bimetallic strip, etc., in response to a voltage to heat-generating wire 7 in its original state, is balanced with a force generated by the temperature sensing member, per se so that in the balanced condition both valve portions 40 and 26 are always brought into their closed positions, following advantages are obtainable; the amount of air consumption becomes minimum, and at the same time problems relating to exhaust gases can be solved without considering use of a special filter, and, further, the cross-sectional area of supply negative pressure communicating port 21 can be made small so as not to be affected by the change of supply pressure, for example.

As is clear from the foregoing, according to this invention, the heat-generating resistor wire is provided in connection with the temperature sensing member and the force generated in the temperature sensing member and the force bearing against the movable member are balanced (self-returned), whereby means for maintaining the supply negative pressure constant, such as a potentiometer, which has been essentially used in a conventional electro-pressure transducer using a bimetallic strip is dispensed with, so that the apparatus is obtainable in controlled characteristics with a simple design. Also, as compared with a conventional apparatus wherein the hot wire is affected by the spring characteristic of the heat-generating resistor wire, per se and the balance of forces to the diaphragm, in this invention, no force is given to the heat-generating resistor wire, and, accordingly, there is no likelihood of disconnection due to vibration and over-current, thus making the life of the wire long and also minimizing the shape thereof to one-fourth to one-fifth.

Further, in this force balancing system, the passages for atmospheric pressure and negative pressure are usually closed by the valve bodies, respectively, this forming a great advantage in taking countermeasures against the exhaust gas produced when this apparatus is used for an automotive car or against clogging of the pipe for supply negative pressure.

Also, the temperature sensing member, per se is allowed to sense the surrounding temperature and thereby also perform the function of the sensing of sensitivity, whereby a temperature controlling apparatus for automatic air conditioning can be obtained wherein the number of the temperature detecting thermistors required in the conventional apparatus can be reduced, it as a whole is smaller in size and has fewer parts than the conventional apparatus, and it is superior in assemblage and in cost, yet, the functions of temperature sensing and conversion into air pressure, making so much accurate and quick temperature control possible.

Figure 6:
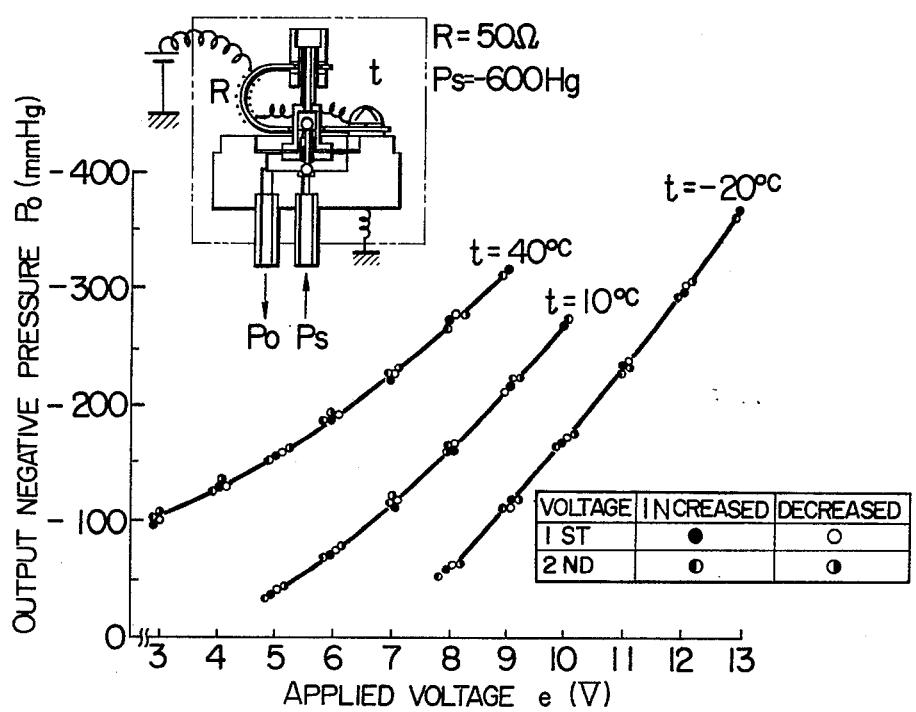
FIG. 6 is a view of the characteristic actually measured of the transducer of this invention.

FIG. 6 shows the characteristic actually measured of electric output to negative pressure conversion in the transducer of this invention. Plot marks "●" are the measured values in the case where in the first measurement the applied voltage was gradually increased; marks "○" are the measured values in the case where in the first measurement the applied voltage was gradually decreased from the most increased value and returned to the original value; marks "◐" are the measured values in the case where in the second measurement the applied voltage was gradually increased; and marks "◑" are the measured values in the case where in the second measurement the applied voltage was gradually increased and returned to the original value.

Figure 3:
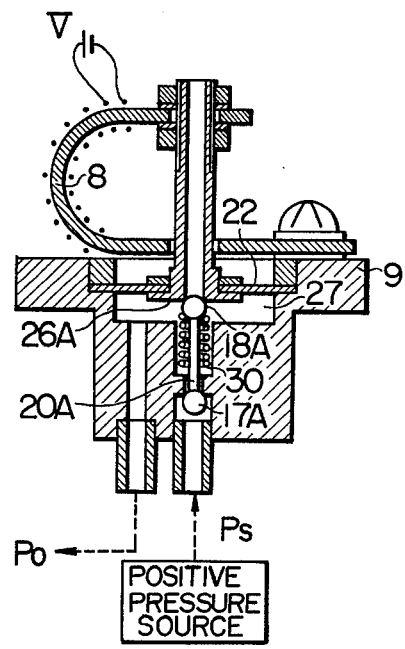
FIG. 3 is a front sectional view showing another embodiment of the transducer as used in the temperature controlling apparatus constructed in accordance with this invention.

FIG. 3 shows another embodiment of the transducer of this invention, wherein a source of positive air pressure is used in place of the source of negative air pressure. Since the positive pressure is applied in the output pressure chamber, the spring force of compression spring 30 bearing against valve bodies 17A and 18A acts upwardly, whereby valve bodies 17A and 18A control the communicating passages for valve portion 20A provided in flange 9 and valve portion 26A provided in the connecting rod, respectively.

Figure 4:
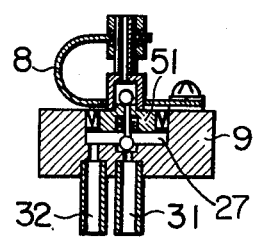
FIG. 4 is a front sectional view showing still another embodiment of the transducer as used in the temperature controlling apparatus constructed in accordance with this invention.

In the foregoing, as shown in the drawing, the movable member may be so constructed as to be able to derive the displacement of the temperature-sensitive member, for example, by using a diaphragm or a piston 51 being slidable along the inside wall of the output negative pressure chamber 27 formed in the flange 9 without leakage of gas therein as shown in FIG. 4.

Also, the heating member may be a transducer having the temperature detecting and air pressure converting functions and be disposed on the temperature sensitive member directly or indirectly, said transducer having various sensitivities are easily produced by varying the thickness and width of the temperature sensitive member and the resistance value of the resistive heating material, etc.

Further, the temperature-sensitive member may be so disposed that one end thereof is fixed to the side of the flange and the other end thereof is fixed to the rod.

We claim:

1. A temperature controlling apparatus for automatic air conditioning comprising:

means for detecting the temperature of at least one place and providing an electric output corresponding to that temperature;

means for generating heat in response to said electric output;

means displaceable in response to the heat from said heat generating means and a temperature in the surroundings of the apparatus;

a source of gas pressure;

an output pressure chamber communicated with said source by a first communicating means, said output pressure chamber being defined in part by movable means movable in substantially the same direction as that of the pressure which acts upon the internal surface of said movable means of said chamber, and having a second communicating means for communicating said chamber with an actuator operated by the pressure from the chamber and passage means communicating with the atmosphere;

means for transmitting the displacement of said displaceable means to said movable means; and means for controlling at least one of said first communicating means and said passage means so as to restore said movable means when displaced in response to said displaceable means.

2. The temperature controlling apparatus for automatic air conditioning according to claim 1, wherein said heat generating means and said displaceable means consist of a heat-generating resistor and a U-shaped bimetallic strip, respectively, said heat-generating resistor being wound spirally around said U-shaped bimetallic strip, and said U-shaped bimetallic strip having one end coupled to means for coupling the displacement of said displaceable means to said movable means and the other end coupled to a fixed member of the apparatus.

3. The temperature controlling apparatus for automatic air conditioning according to claim 2, wherein said passage means is provided in a movable portion of said movable means, and said first communicating means and controlling means include a first valve body for controlling said passage means, a second valve body for controlling said first communicating means, means for interconnecting said first and second valve bodies and means for applying to said bodies such a force as to allow them to close said passage means and said first communicating means simultaneously.

4. The temperature controlling apparatus for automatic air conditioning according to claim 3, wherein said temperature detecting means consists of a plurality of thermistors connected in service to each other so as to detect temperatures at different places and provide an electrical output adapted to be transmitted to said heat generating means through an amplifier.

5. The temperature controlling apparatus for automatic air conditioning according to claim 4, wherein said source of gas pressure is a source of negative gas pressure.

6. The temperature controlling apparatus for automatiic air conditioning according to claim 5, wherein as said source of negative pressure a source of negative pressure in an intake manifold is used.

7. The temperature controlling apparatus for automatic air conditioning according to claim 6, wherein one of said thermistors is mounted in the car room and another thermistor is positioned at the downstream of a heat exchanger, said bimetallic strip is positioned in the vicinity of a car room air conditioning door, and said actuator actuates a damper for controlling the flow of cooled or heated air in said heat exchanger.

* * * * *

UNITED STATES PATENT OFFICE
CERTIFICATE OF CORRECTION

Patent No. 3,877,638         Dated April 15, 1975

Inventor(s) Matsuo AMANO, Ichiro KIMURA, Tosikatsu ITO and Katsuo KANEMOTO

It is certified that error appears in the above-identified patent and that said Letters Patent are hereby corrected as shown below:

Title page, insert the following:

[30] Foreign Application Priority Data

October 9, 1972      Japan............47-100670

Signed and Sealed this twenty-fifth Day of November 1975

[SEAL]

Attest:

RUTH C. MASON
Attesting Officer

C. MARSHALL DANN
Commissioner of Patents and Trademarks